United States Patent [19]
Trapani et al.

[11] Patent Number: 5,935,458
[45] Date of Patent: Aug. 10, 1999

[54] WIRE THERMAL SPRAY APPARATUS WITH DUAL MOTORS

[75] Inventors: Richard D. Trapani, Flushing; Anthony J. Fuimefreddo, Wantagh, both of N.Y.

[73] Assignee: Sulzer Metco (US) Inc., Westbury, N.Y.

[21] Appl. No.: 08/929,848

[22] Filed: Sep. 15, 1997

Related U.S. Application Data

[60] Provisional application No. 60/035,272, Dec. 19, 1996.

[51] Int. Cl.$^6$ ........................................ B23K 9/00
[52] U.S. Cl. .................... 219/121.47; 219/76.15; 219/76.16; 239/83; 239/84; 226/4
[58] Field of Search .................... 239/83, 84; 219/76.15, 219/76.16, 121.47; 226/4, 42, 43, 108

[56] References Cited

U.S. PATENT DOCUMENTS

| | | | |
|---|---|---|---|
| 2,719,245 | 9/1955 | Anderson | 314/69 |
| 3,148,818 | 9/1964 | Charlop | 226/176 |
| 3,293,477 | 12/1966 | Lobosco | 219/121.47 |
| 3,630,425 | 12/1971 | Wilkens | 226/108 |
| 4,668,852 | 5/1987 | Fox et al. | 219/76.14 |
| 5,275,336 | 1/1994 | Stasi et al. | 239/84 |
| 5,540,371 | 7/1996 | Gilliland | 266/108 |

FOREIGN PATENT DOCUMENTS 1638109  1/1987  Japan .

OTHER PUBLICATIONS

"Application Notes—Issue 2" Section 2 Sprint Electric (1994).
"Drive Training" Sprint Electric (undated).

*Primary Examiner*—Andres Kashnikow
*Assistant Examiner*—Dinh Q. Nguyen
*Attorney, Agent, or Firm*—H. S. Ingham

[57] ABSTRACT

A wire thermal spray gun such as a two-wire arc gun has a speed regulator for a DC pull motor in the gun. Armature current corresponds to pulling torque on the pull motor depending on load resistance of the wires. A DC push motor is between a wire supply and the gun, with wire conduits connecting to the gun. A controller provides the push motor with a controlled pushing torque. Feedback of the armature current of the pull motor to the controller adjusts the pushing torque in direct response to change in the pulling torque, such that load sharing is maintained between the push motor and the pull motor.

13 Claims, 4 Drawing Sheets with longer distances between the gun and a supply source of the wire. A particular object is to provide
WIRE THERMAL SPRAY APPARATUS WITH DUAL MOTORS This application claims the benefit of U.S. Provisional Application No. 60/035,272 filed Dec. 19, 1996.

BACKGROUND

This invention relates to thermal spraying, particularly to wire thermal spraying apparatus with two motors for feeding the wire, and more particularly to arc thermal spraying apparatus with two motors for feeding the wire.

Thermal spraying involves the feeding of a material through a heating zone to melt the material and propel it in finely divided form to a substrate to produce a coating. In one class of thermal spray guns, a wire tip is melted and atomized by a gas (usually air) at high pressure to produce the spray stream. The wire typically is a metal such as steel, nickel alloy, molybdenum, aluminum or zinc to effect coatings for repair, electrical conductivity, or resistance to wear, heat or corrosion.

Several means for heating may be utilized. One is with a combustion gun, for example as taught in the aforementioned U.S. Pat. No. 5,275,336 (Stasi et al.), wherein a single wire is fed axially through a nozzle into an annular ring of combustion jets such as an oxygen-acetylene flame which melt the tip. An air cap encompassing the nozzle and wire tip channels the annular flow of compressed air to atomize the melting tip and produce the spray stream.

Another type is an arc thermal spray gun in which two wires are fed into the gun and brought together at their tips in the spray head, for example as taught in U.S. Pat. No. 4,668,852 (Fox et al.) Electrical current passed via tubular electrodes contacting the wires near the tips effects an arc between the wires to melt the tips. An air cap encompasses the electrodes and wire tips so as to channel the annular flow of air to atomize the melting tips and produce the spray stream. An arc gun has a control unit where a power supply is contained. Arc current is fed to the gun electrodes via cables that may be incorporated in conduits guiding the wires to the gun.

Wire feeding is continuous and generally is effected by a light motor in the gun that, along with a wire engagement mechanism, pulls each wire from a wire supply such as a reel or barrel. The motor may be an air turbine or an electrical motor with an associated power supply and speed control. The electrical motor typically is DC with a silicon controlled rectifier (SCR) power supply which is capable of varying the motor speed. Often the single gun motor is sufficient. However, for longer distances from the wire supply, particularly in the case of arc guns, a second push motor is desired or even necessary to overcome loading in the conduits and pulling the wires from their supplies. A push-pull, two-wire arc thermal spray gun apparatus is disclosed in Japanese patent No. 1638109, and a push-pull one-wire welding apparatus is disclosed in U.S. Pat. No. 2,719,245. The push motor is mounted near the wire supply and has a wire engagement mechanism similar to that of the push motor. Settings of the push motor have been quite critical so as to provide enough pushing torque to take some of the loading from the pull motor, but not push so hard as to jam and bind the wire into the cable. Often there have been oscillations in the wire feeding without proper settings.

Regulated load sharing between two motors has been known for heavier duty applications than for thermal spraying. In one case three phase motors drive each end of a large printing roll to reduce torsion in the roll. The motors are identical, have a fixed spacing, and operate at constant speed. Paper width and thickness may be different at different times.

Another application has been in wire mills where rods are reduced in size by a series of motor-driven roll mills that operate at very high speed at the smaller diameter end. A larger size motor pulls rod through the mill, and a smaller motor feeds the wire into its end configuration. Distances are fixed. The material may vary from time to time, with correspondingly different motor settings. A further application has been for a belt drive, with identical motors and all other conditions remaining constant.

In these load sharing applications, one motor is maintained at a constant speed by conventional means such as armature voltage or tachometer feedback, or by constant speed AC operation. A signal representing loading torque of that motor is detected, being an armature current measurement in the case of a DC motor. The torque current signal is fed to the second motor to regulate its current and thereby adjust its torque in proportion to that of the first motor. Circuitry for load sharing for larger motors is shown schematically in "Application Notes—Issue 2" of Sprint Electric, section 2 page 2 (undated).

SUMMARY OF THE INVENTION

An object of the present invention is to provide a wire type of thermal spray apparatus with improved feeding of wire, particularly with longer distances between the gun and a supply source of the wire. A particular object is to provide a two-wire arc thermal spray apparatus with improved feeding of the wires. A further object is to provide an improved wire thermal spray apparatus using push and pull drive motors with load sharing.

The foregoing and other objects are achieved, at least in part, by a wire thermal spray apparatus comprising a thermal spray gun with an electrical pull motor, speed regulation means for regulating speed of the pull motor, a wire pushing system with an electrical push motor, and a control system for controlling the push motor. The gun has a pulling means of wire engagement operatively connected to the pull motor to pull one or two thermal spray wires from associated wire supplies into the gun, melting means for melting each wire at its tip, and atomizing means for atomizing each melted wire tip to effect a spray stream. Generally the pull motor should be regulated at a constant speed, but has a varying pulling torque responsive to changing load resistance of the one or two wires.

The wire pushing system is disposed between the wire supply and the gun, and includes a pushing means of wire engagement operatively connected to the push motor to push the one or more wires to the gun, and a conduit for each wire connected to guide the wire from the pushing means to the pulling means. The control system comprises a motor controller operatively connected to control the push motor with a controlled pushing torque, and torque feedback means responsive to the pulling torque and operatively connected to the controller for the controller to adjust the pushing torque in direct response to a change in the pulling torque, such that load sharing is maintained between the push motor and the pull motor.

Advantageously the speed regulation means comprises a regulated first source of electrical power, the pull motor is a DC motor having an armature connected to the first source, and the torque feedback means comprises means for measuring armature current of the pull motor whereby the armature current is representative of the pulling torque. The push motor also is a DC motor, and the controller comprises a second source of electrical power connected to supply drive power to the push motor, the second source being responsive to the armature current for adjustment of the drive power so as to maintain the load sharing.

In a preferred embodiment, the thermal spray gun is an arc gun for thermal spraying with two wires having arc-melted wire tips at the gun.

DETAILED DESCRIPTION

Figure 1:
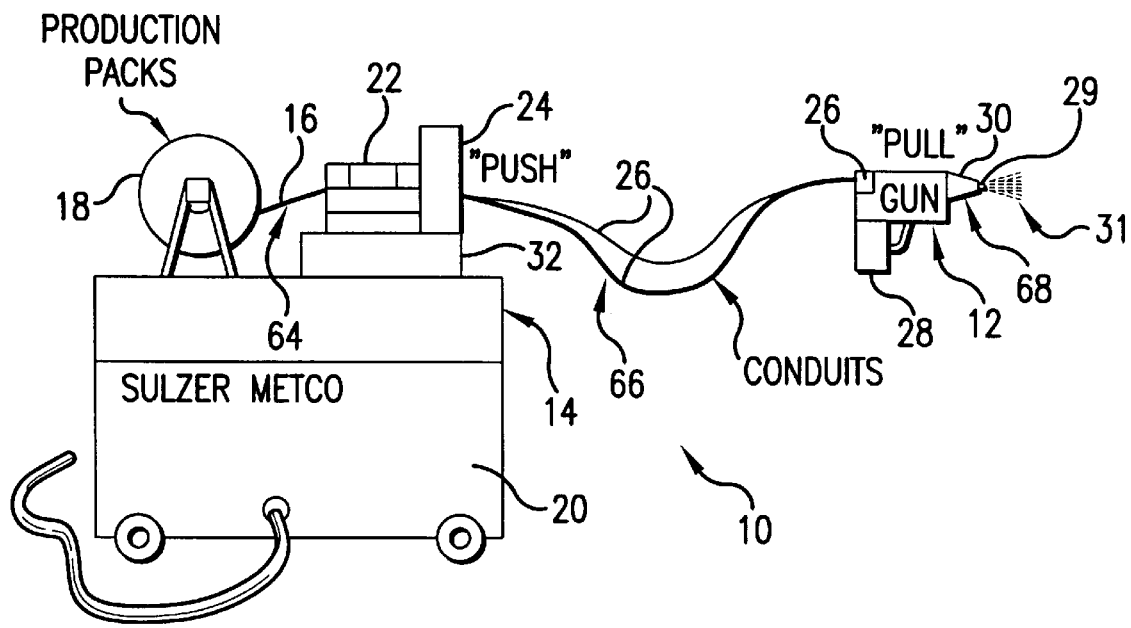
FIG. 1 is a schematic drawing of a thermal spray apparatus of the invention.

A wire thermal spray apparatus 10 (FIG. 1) utilizing the invention includes a thermal spray gun and a control unit 14. One or two wires 16 (one shown) are supplied from one or two reel stands 18 (one seen) mounted on a rectifier housing 20 of the control unit, or from separate production packs such as barrels containing the wire. Each wire passes through a wire engagement mechanism 22 driven by a push motor 24, and thence through a wire conduit 26 to the gun. The gun, which generally is a conventional type, also has a wire engagement mechanism 26 driven by a pull motor 28 to feed the wires into a spray head 30 at the front of the gun. The push motor, its wire engagement means and the conduit constitute a wire pushing system.

The tip 29 of each wire is melted in the spray head and atomized by a high pressure blast of gas, generally air. The spray stream 31 generated by the blast typically is directed to a substrate (not shown) to build up a coating. The wires are fed continuously and cooperatively from the wire supply by both the push motor in the control unit and the pull motor in the gun to provide a continuous spray stream. Motor controls 32 are located in the control unit 14 which also has appropriate meters, control switches and knobs, such as for wire speed, gas pressure and flow, and electrical voltage and current. Optionally controls associated with the pull motor, and an on-off switch, may be located in the gun. Electrical leads between the control unit and the gun preferably are contained in or bundled with the conduits.

The wire tips are melted by any conventional or other desired means. Such means typically utilize a combustion flame or an arc, but may incorporate other means such as plasma or induction heating. In the case of a combustion gun, for example as taught in the aforementioned U.S. Pat. No. 5,275,336 ("Stasi patent") incorporated herein by reference, particularly with reference to FIG. 1 thereof, a single wire is fed axially through a nozzle into an annular ring of combustion jets such as an oxygen-acetylene flame which melt the tip. An air cap encompassing the nozzle and wire tip channels the annular flow of compressed air to atomize the melting tip and produce the spray stream.

In the case of arc heating, two wires are fed into the gun and brought together at their tips in the spray head, for example as taught in the aforementioned U.S. Pat. No. 4,668,852 ("Fox patent") incorporated herein in its entirety by reference. Electrical current passed via tubular electrodes contacting the wires near the tips effects an arc between the wires to melt the tips. An air cap encompasses the electrodes and wire tips so as to channel the annular flow of air to atomize the melting tips and produce the spray stream. The arc current is brought by cables (preferably incorporated into the conduits) to the electrodes from a rectifier in the control unit, the rectifier being connected to an AC power line. The present invention is particularly advantageous when incorporated into a two-wire arc type of wire thermal spraying apparatus.

Figure 2:
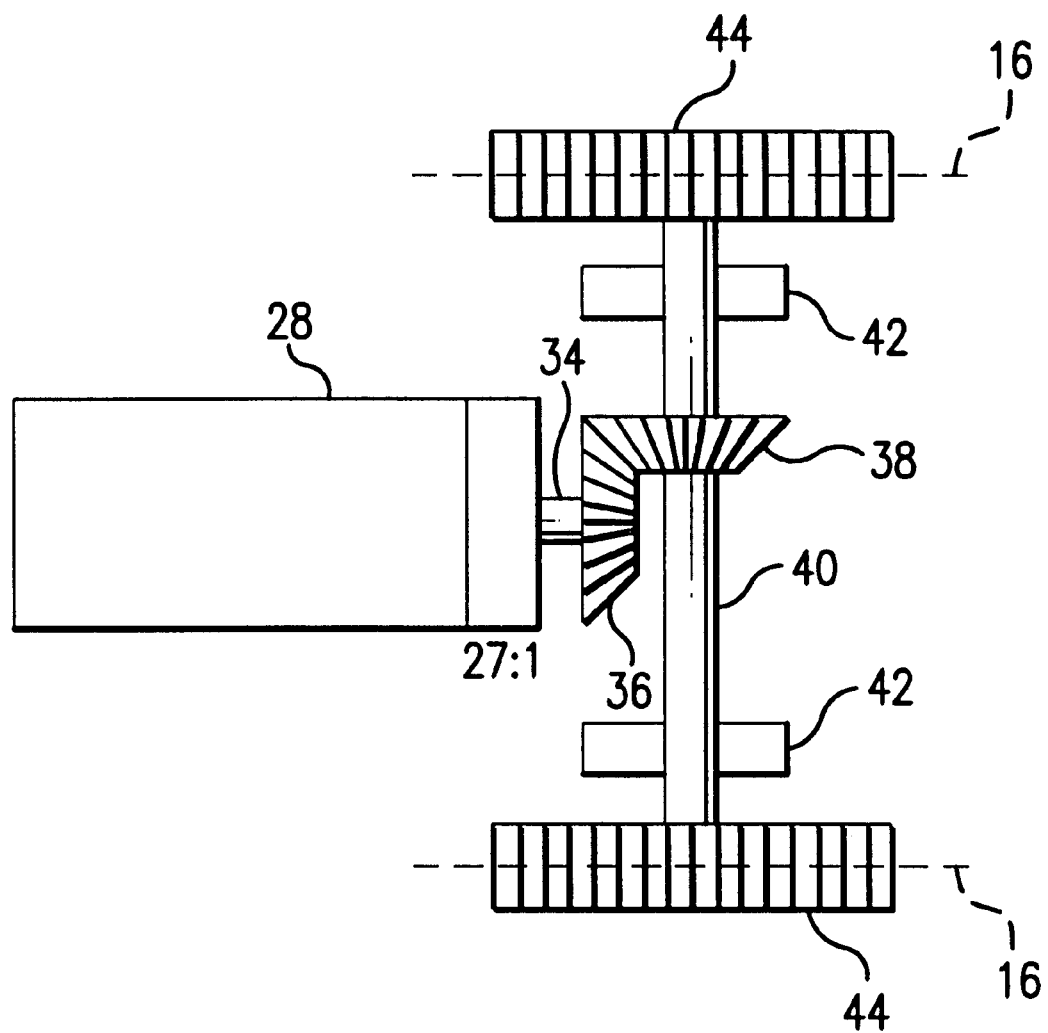
FIG. 2 is top view of a wire feed mechanism utilized in the apparatus of FIG. 1.

The wire engagement mechanisms in the gun and the control unit may be any conventional or desired type such as disclosed for the guns in the aforementioned Stasi and Fox patents. For example (FIG. 2), in an arc gun the shaft 34 of the pull motor 28 drives a first bevel gear 36 against a second bevel gear 38 mounted on an insulated shaft 40 (e.g. plastic) which in turn is supported in a pair of bearings 42. The ends of the shaft drive two rollers 44 that engage the wires 16. A first roller gear is affixed to each roller to drive a second roller gear and corresponding drive roller as shown in the Stasi patent (FIG. 3 thereof), A gearing system is shown in U.S. Pat. No. 3,148,818 ("Charlop patent"), FIG. 2 thereof and associated descriptions being incorporated herein by reference; this system is for a single wire combustion gun, but is suitable for two wires being driven in parallel. A release mechanism for the drive rollers is advantageous, conveniently being a pneumatic (air) arrangement as disclosed in the Charlop patent.

The push gun drive mechanism is similar, the motor advantageously driving a worm gear engaged with a worm wheel gear on an insulated shaft (replacing the bevel gears). The mounting of the shaft on bearings and driving of a pair of rollers on each side is substantially the same as for the gun. A mechanical release arrangement such as shown for a gun in the Fox patent (FIG. 3 thereof) is suitable.

The electric motors are conventional or other suitable desired types utilized in such guns, generally being light duty motors. The motors, particularly the pull motor, preferably are single phase, direct current (DC), permanent magnet motors. Alternative motors may be AC or CD servo drive motors, or AC motors with vector drives. Advantageously the pull motor in the gun is a lower voltage (generally up to 180 VDC), lighter weight motor than the push motor in the control unit where extra torque may be needed to draw the wire from the reel or production pack. Example specifications for a single phase DC pull motor are 42 VDC, 2 amperes full load (AFL) and maximum 7540 rpm before a 27:1 gearbox, and for the push motor are 90 VDC, 2.6 amperes full load (AFL) and maximum 2500 rpm before a 15:1 gearbox. Motor speed after the gearboxes and further gearing in the wire engagement mechanisms 22, 26 to the drive rollers effect wire feed speed between up to about 30 m/s or as otherwise required for a thermal spray operation. Minimum wire speed available from the system depends on practical factors including control technology and relative signal/noise in the control feedbacks; minimum speed generally should be less than 5% of maximum. The push motor should not go its current limit when feeding the wire.

Figure 3:
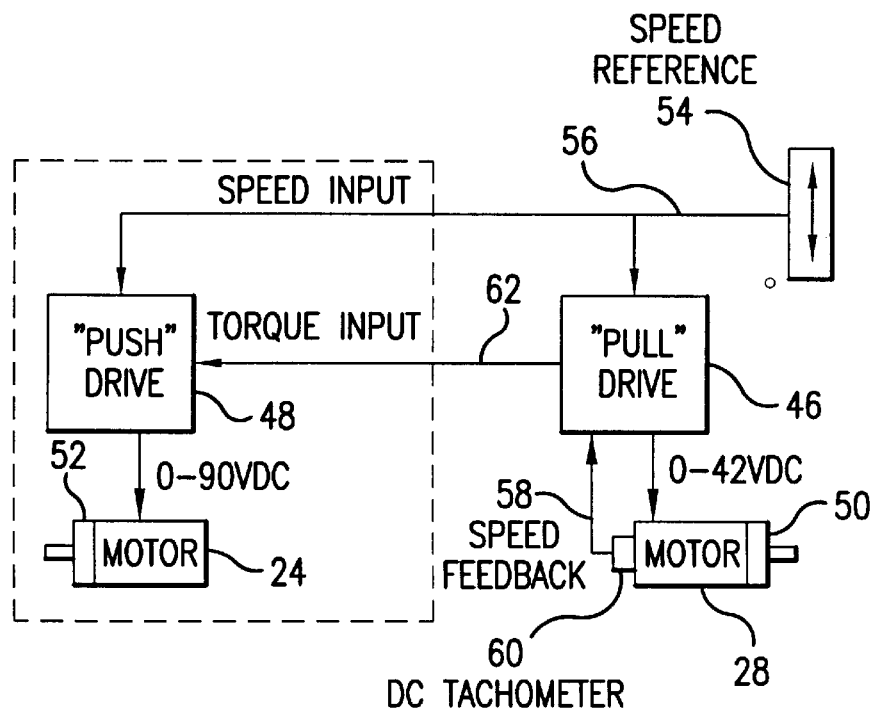
FIG. 3 is a schematic drawing of major components of control systems utilized in the apparatus of FIG. 1.

The pull motor 28 in the gun has a first source 46 of regulated electrical power (FIG. 3). The power source to the armature 50 preferably is a silicon controlled rectifier (SCR) circuit. A regulator circuit provides input to the source power (viz. regulated firing angle to the SCR) to regulate the speed of the pull motor.

The push motor 24 has a second source 48 of regulated electrical power applied to the armature for a DC motor. This source also preferably is a silicon controlled rectifier (SCR) drive circuit supplying current to the armature, with control input from a second regulator circuit. Other configurations may include supplying current to the motor field if used in place of a permanent magnet.

During ordinary spray operations the speed is regulated to be constant. However during startup and shutdown, the speed should be regulated ramping. The speed of the pull motor (and optionally the push motor to a limited extent) and thereby the wire feeding speed, is selected by a setting of a speed potentiometer 54 that is linked 56 to both power sources 46, 48. This potentiometer is mounted on the gun or the control unit (or remotely).

Speed is regulated by measurement of the speed of the pull motor to produce a corresponding feedback signal on a line 58 to the first power source 46. The motor speed for a DC motor may be represented by the back voltage of the armature 50 (armature voltage compensated for IR drop), or by a conventional motor-mounted tachometer 60 to effect a voltage proportional to rotational speed. With the feedback signal, and suitable calibration, motor rotational speed is regulated independently of motor loading which varies with changing load resistance of the wires from their reels and resistances in the conduits. Thus, to maintain constant speed with the changing load resistance, the power source acting from the feedback by way of the regulator will provide more or less drive power to the motor to change the torque to maintain the speed. The physical connection of the motors through the spray wires 16 establishes the push motor speed the same as for the pull motor, except for transients due to play of the wire in the conduits 26.

Wire speed, set manually with the potentiometer, is selected or determined conventionally for the thermal spraying operation and also depends on wire size. For combustion gun spraying, the wire speed may be selected from a wide range to establish a desired spray rate or stable spraying condition, typically being as fast as possible without irregularities ("spitting") in the atomization. For the two wire arc process, wire speed is coordinated with the arc current to stabilize and substantially optimize the arcing, there being arc current oscillations and irregular atomizing if the wire speed is significantly above or below an optimum. An arc gun apparatus of the invention is particularly effective for maintaining optimum arcing.

A measurement representative of the pulling torque of the pull motor also is made. As armature current is proportional to torque, this is measured conveniently by a Hall device or the like. The corresponding signal is provided as feedback on a line 62 to the second regulator circuit for regulating the second power source to the push motor. As pull motor loading and torque increase, power is increased to the push motor so as to increase its share of the load. Conversely, as pull motor loading and torque decrease, power is decreased to the push motor so as to decrease its share of the load. It generally is advantageous for the operating torques for the two motors in the load sharing to be about the same, and the motors should go to their load limits together. However, the torque ratio may vary considerably during operation (e.g. between about 1:50 to 50:1) depending on circumstances of relative loading in the wire supply, conduit and gun.

The conduits 26 (FIG. 1) should be configured with a loose but close sliding fit to the wires, so as to minimize slack of the wire in the conduit which may cause oscillation or chattering in association with the torque feedback. The conduit inside diameter should be between approximately 1.3 and 2 times the wire diameter. Low friction is desirable, so the conduit preferably has an inside liner containing lubricant that may be a fluid but preferably is a solid lubricant in the liner so as not to interfering with the spraying. A conduit with molybdenum disulfide contained in the conduit liner is suitable.

The wire may be seen to have three sections where mechanical load resistances are introduced, namely an input section 64 between the wire reel (or pack) and the push motor, a conduit section 66 between the push motor and the pull motor and, after the pull motor, a tip section 68 that may include the electrodes. The resistances in each of these sections may be continually or intermittently changing. Although termed conventionally herein and in the claims as a "push motor", because this motor has as its primary function to push for the conduit and tip and third wire sections, this motor also helps to pull wire from the reel (or pack). Moreover, the "pull motor", although primarily having pulling function, may push against any resistance in the tip section. Similarly, as used herein and in the claims, the terms "pushing torque" and "pulling torque" refer to the primary, and generally net functions of the respective motors and, therefore, may partially or occasionally have some opposite aspect, namely pulling and pushing respectively. Also, for a two wire gun, it also should be recognized that the type and degree of loading may vary between the wires in any or all of six sections, including variations in loading between the two wires. In view of these variations, successful and beneficial operation of the load sharing in this environment is considered surprising, even for one type of wire, one wire size and a selected conduit length.

As will be appreciated, there are a wide range of wire and spraying speeds that may be required of the apparatus. Also a range of desirable wire sizes and stiffnesses (from different spray materials) contribute a wide range of load resistances transferred from the wires to the motors. Conduit length is another variable for changing setups of the thermal spray apparatus. Proper selection and tuning, particularly of the torque control, may be achieved to allow suitable ranges without further adjustment. For example, for an arc gun, no further adjustment should be required between hard wires (e.g. high carbon steel) and soft wires (e.g. zinc), generally between 1.5 and 2.3 mm diameter, and from 4 to 15 m conduit length. It has been found that an apparatus of the present invention provides for surprisingly stable arc gun spraying for quite a wide range of wire types and sizes, and conduit lengths and configurations, including moving the gun around in a variety of positions relative to the control unit.

Figure 4:
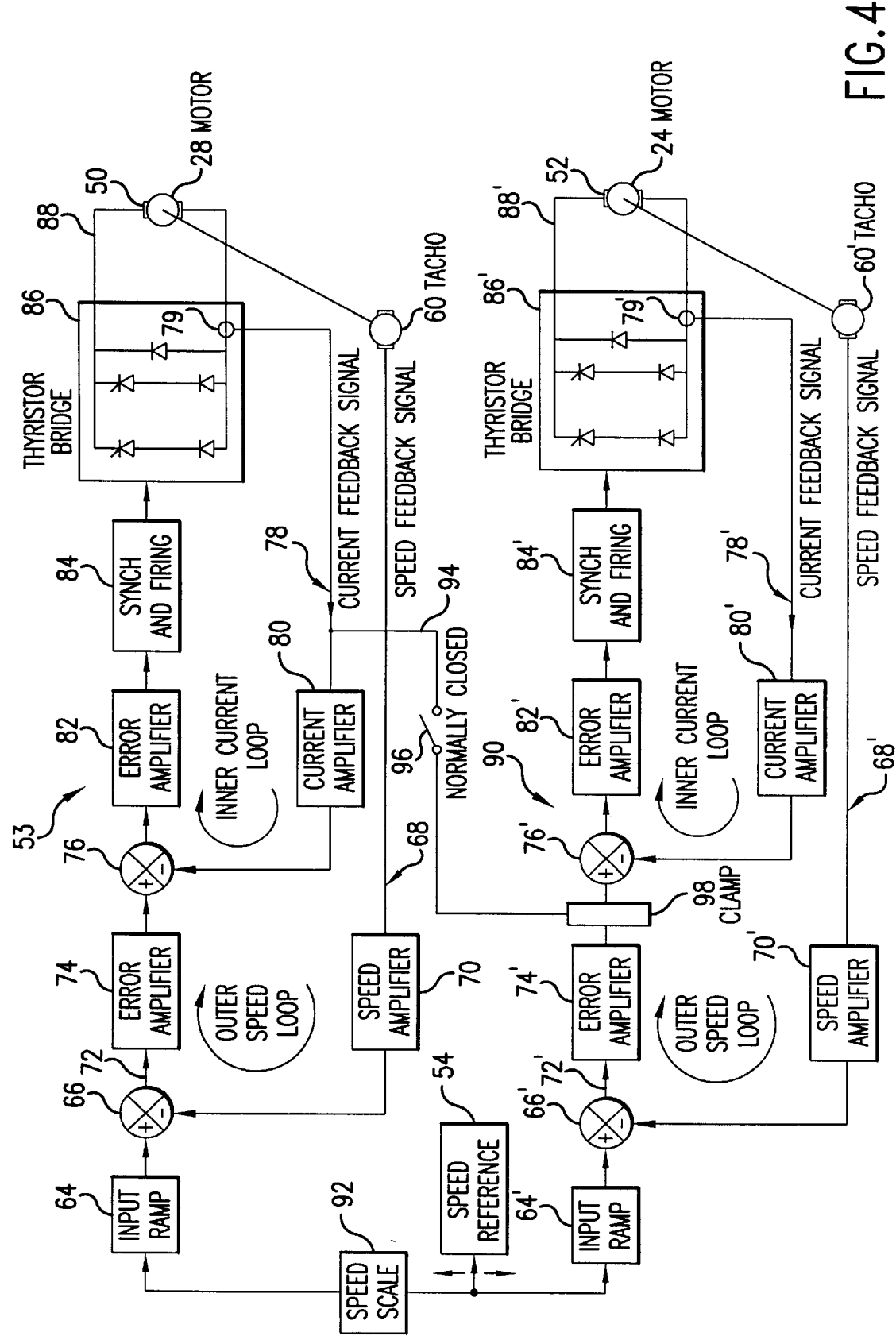
FIG. 4 is a schematic drawing of major components of a control circuit utilized in a control system of FIG. 3.

In the control system 53 for the pull motor 28 (FIG. 4), the desired speed is selected through the setting of the speed potentiometer 54 to supply a corresponding set voltage. This is fed through a ramping circuit 64 for starting and stopping to a differential junction 66. The feedback signal from the tachometer 60 (or armature voltage compensated for IR drop) on an outer (speed) feedback loop 68 is amplified 70 and passed to the differential junction 66 which effects an error signal on a line 72. This signal is amplified 74 and passed through a second differential junction 76. In an inner feedback loop 78, a signal representing armature current (torque) from a Hall device 79 is amplified 80 and passed to the second differential junction 76. The resulting second error signal is amplified 82 and processed through a synchronization and firing circuit 84 for regulating the SCR bridge circuit 86, and thereby the current on line 88 to the armature 50. Although the feedback control is responsive primarily to maintain constant speed, response also to change of torque loading provides a more rapid adjustment to maintain the constant speed.

The control system 90 for the push motor 24 may be similar to and use much of the same circuitry 53 as for the pull motor 28, with similar components being designated for the circuit 90 by the same numerals as circuit 53 with a prime (SCR 86', etc.). A single speed reference 54 utilizing a potentiometer for speed setting may be used in common, with an added speed scaler 92 utilizing an added resistance or other circuitry in the line connecting to the pull control system so that the selected speed of the push motor is hypothetically 10% to 20% faster than the pull motor. A current (torque) signal from the first circuit is fed on a line 94 through a normally closed switch 96 to a clamp circuit 98 which functions as a selector switch in the push control system. This circuit selects only the smaller of the two signals, i.e. either the current signal from the pull motor or the speed error signal from the first error amplifier of the push motor. The selected signal is fed to the difference circuit 76' for comparison with current signal from the first error amplifier 74'. Normally the current from the pull motor prevails and, therefore, controls the torque of the push motor.

The speed feedback loop 68' for the push motor is not a necessary or normal aspect of the push motor control system, but is useful for initial feeding of wire through the conduit to the gun, when there is almost no frictional load on the pull motor with no wire to pull. The switch 96 in the current line 94 is opened for this initial feeding operation; this may be manual or automated with a sensor of low torque or lack of wire (e.g. with a microswitch) in the pull motor. Other means may be used for disconnecting the torque feedback means from the controller during initial feeding of each wire through the conduit to the gun, without either wire being engaged in the gun. For example, the switch 96 may be eliminated, with the clamp circuit replaced with a selection switch for selecting either the armature current feedback or the speed control for the push motor. The switch may be operated manually or from some other sensor such as a microswitch in the gun to detect lack of wire there.

Figure 5:
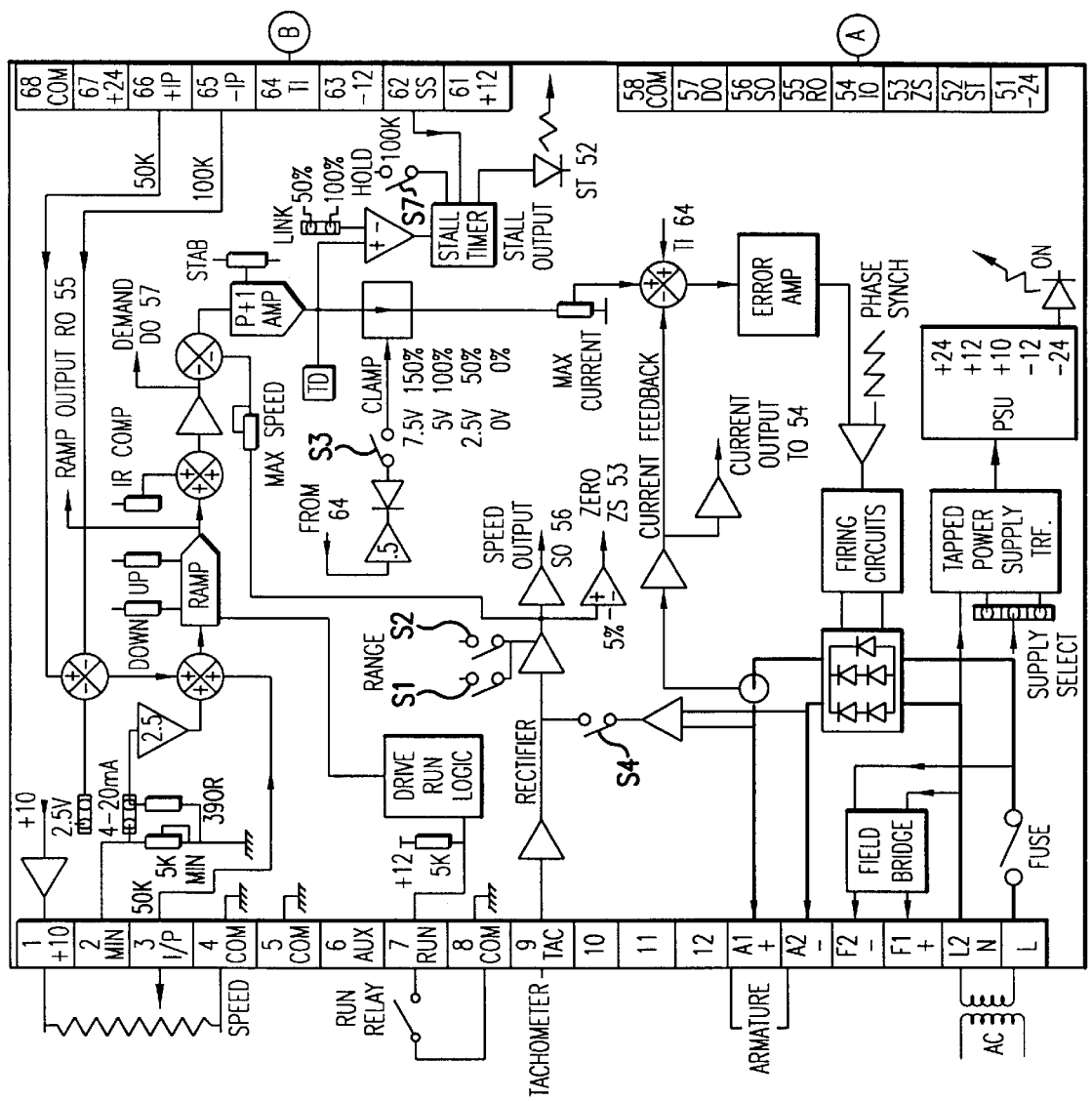
FIG. 5 is a basic circuit diagram of the circuit of FIG. 4.

FIG. 5 shows a schematic circuit diagram for either of the control systems 53, 90. A suitable circuit board for each pull control and push control is Model 400i of Sprint Electric, Reston Va., described in a Drive Training manual of Sprint Electric (undated). The features of FIG. 5 should be apparent from a comparison with the block diagram of FIG. 3 and associated descriptions. Switch S4 is opened for a tachometer and closed if armature voltage is used for speed measure. The signal for the torque current from the pull motor is taken from point A of the pull motor control and fed in at point B of the push motor control. For the pull motor control, switch S1 is closed and switches S2 and S3 are open; for the push motor control these positions are reversed. The potentiometers are adjusted initially to optimized settings for ramping and stability, and thereafter normally do not need to be changed. However, some readjustment of the controls may be required for more substantial changes in wire types, wire sizes and conduit lengths. In addition to those circuit sections discussed above, a stall section of the circuit shuts down the armature current in the event of overload. The push motor maximum torque may be set above (e.g. 150%) of its rated torque, a condition essentially never reached with a shut-down feature in the circuit. AC input for the pull circuit is 60 VAC and for the push circuit is 120 VAC. The speed potentiometer 2 KΩ, 2 W.

Suitable potentiometer settings for the pull control are: down ramp, full clockwise (CW); up ramp, full CW; minimum speed, full counterclockwise (CCW); maximum speed, 70% (between CCW and CW); stabilization, full CCW; IR compensation, 20%; maximum current, 100%; and jumper power supply select is 60 VAC. Suitable potentiometer settings for the push control are: down ramp, full clockwise (CW); up ramp, full CW; minimum speed, full CCW; maximum speed, 90%; stabilization, 20%; IR compensation, 20%; between CCW and CW; maximum current, full CW; and jumper power supply select is 120 VAC.

While the invention has been described above in detail with reference to specific embodiments, various changes and modifications which fall within the spirit of the invention and scope of the appended claims will become apparent to those skilled in this art. Therefore, the invention is intended only to be limited by the appended claims or their equivalents.

What is claimed is:

1. A wire thermal spray apparatus comprising:

a wire thermal spray gun comprising an electrical pull motor, a pulling means of wire engagement operatively connected to the pull motor to pull one or two thermal spray wires from associated wire supplies into the gun, melting means for melting each wire at its tip, and atomizing means for atomizing the melted wire tip to effect a spray stream, the pull motor having a varying pulling torque responsive to changing load resistance of the one or two wires;

a wire pushing system disposed between the wire supply and the gun, the system comprising an electrical push motor, a pushing means of wire engagement operatively connected to the push motor to push each wire to the gun, and a wire conduit for each wire connected to guide the wire from the pushing means to the pulling means;

speed regulation means for regulating speed of the pull motor;

a control system for controlling the push motor, comprising a motor controller operatively connected to control the push motor with a controlled pushing torque, and torque feedback means responsive to the pulling torque and operatively connected to the controller for the controller to adjust the pushing torque in direct response to a change in the pulling torque, such that load sharing is maintained between the push motor and the pull motor; and means for disconnecting the torque feedback means from the controller during initial feeding of wire through the conduit to the gun, without the wire being engaged in the gun.

2. The apparatus of claim 1 wherein the speed regulation means comprises means for maintaining the pull motor at a constant speed.

3. The apparatus of claim 2 wherein the speed regulation means comprises a regulated first source of electrical power, the pull motor is a DC motor having an armature connected to the first source, the torque feedback means comprises means for measuring armature current of the pull motor whereby the armature current is representative of the pulling torque, the push motor is a DC motor, and the controller comprises a second source of electrical power connected to supply drive power to the push motor, the second source being responsive to the armature current for adjustment of the drive power so as to maintain the load sharing.

4. The apparatus of claim 3 wherein the speed regulation means further comprises speed feedback means responsive to the speed of the pull motor, the speed feedback means being operatively connected to the first source for the first source to maintain the pull motor at constant speed.

5. The apparatus of claim 1 wherein each conduit is configured with a loose sliding fit to the wire.

6. The apparatus of claim 5 wherein each conduit has an inside liner containing a lubricant.

7. A wire thermal spray apparatus comprising:

an arc thermal spray gun for thermal spraying with two wires having converging wire tips at the gun, the thermal spray gun comprising a single electrical pull motor, a pulling means of wire engagement operatively connected to the pull motor to pull the two wires from associated wire supplies into the gun, melting means for melting the wires at their tips including means for effecting electrical arcing across the wire tips, and atomizing means for atomizing the melted wire tips to effect a spray stream, the pull motor having a varying pulling torque responsive to changing load resistance of the wires;

a wire pushing system disposed between the wire supply and the gun, the system comprising a single electrical push motor, a pushing means of wire engagement operatively connected to the push motor to push each wire to the gun, and a wire conduit for each wire connected to guide the wire from the pushing means to the pulling means;

speed regulation means for regulating speed of the pull motor; and a control system for controlling the push motor, comprising a motor controller operatively connected to control the push motor with a controlled pushing torque, and torque feedback means responsive to the pulling torque and operatively connected to the controller for the controller to adjust the pushing torque in direct response to a change in the pulling torque, such that load sharing is maintained between the push motor and the pull motor.

8. The apparatus of claim 7 wherein the speed regulation means comprises means for maintaining the pull motor at a constant speed.

9. The apparatus of claim 8 wherein the speed regulation means comprises a regulated first source of electrical power, the pull motor is a DC motor having an armature connected to the first source, the torque feedback means comprises means for measuring armature current of the pull motor whereby the armature current is representative of the pulling torque, the push motor is a DC motor, and the controller comprises a second source of electrical power connected to supply drive power to the push motor, the second source being responsive to the armature current for adjustment of the drive power so as to maintain the load sharing.

10. The apparatus of claim 9 wherein the speed regulation means further comprises speed feedback means responsive to the speed of the pull motor, the speed feedback means being operatively connected to the first source for the first source to maintain the pull motor at constant speed.

11. The apparatus of claim 7 wherein each conduit is configured with a loose sliding fit to the wire.

12. The apparatus of claim 11 wherein each conduit has an inside liner containing a lubricatant.

13. The apparatus of claim 7 further comprising means for disconnecting the torque feedback means from the controller during initial feeding of each wire through the conduit to the gun, without either wire being engaged in the gun.

* * * * *